Jan. 3, 1950 — R. G. LE TOURNEAU — 2,493,300
CHUCK
Filed Jan. 3, 1947

INVENTOR.
R. G. LeTourneau
BY
ATTYS

Patented Jan. 3, 1950

2,493,300

UNITED STATES PATENT OFFICE 2,493,300

CHUCK

Robert G. Le Tourneau, Longview, Tex., assignor to R. G. Le Tourneau, Inc., Stockton, Calif., a corporation of California Application January 3, 1947, Serial No. 720,000

3 Claims. (Cl. 279—58)

This invention relates to, and it is an object to provide, an improved multiple jaw, collet type chuck for lathes.

Another object of the invention is to provide a chuck, of the type described, operative to positively and accurately secure a work piece, for machining thereof, of relatively large diameter; the chuck being power controlled and fast acting to engage or release the work piece.

A further object of the invention is to provide a collet chuck comprising a plurality of segmental, radial jaws disposed about a common axis and arranged for controlled axial movement; there being a novel multiple taper assembly operative, upon such movement in one direction, to cause the jaws to simultaneously shift radially inwardly into gripping engagement with the work piece.

An additional object of this invention is to provide a chuck, as in the preceding paragraph, wherein said multiple taper assembly comprises a pair of radially spaced, axially offset cooperating sets of tapers between each jaw and the chuck body; the radially innermost sets guiding the jaws in correct axial alinement, and the radially outermost sets provide a wedging action to cause the jaws to forcefully grip the work piece.

A further object of the invention is to provide a practical and rugged, but simple and inexpensive chuck which will be exceedingly effective for the purpose for which it is designed.

These objects are accomplished by means of such structure and relative arrangement of parts as will fully appear by a perusal of the following specification and claims.

Figure 1:
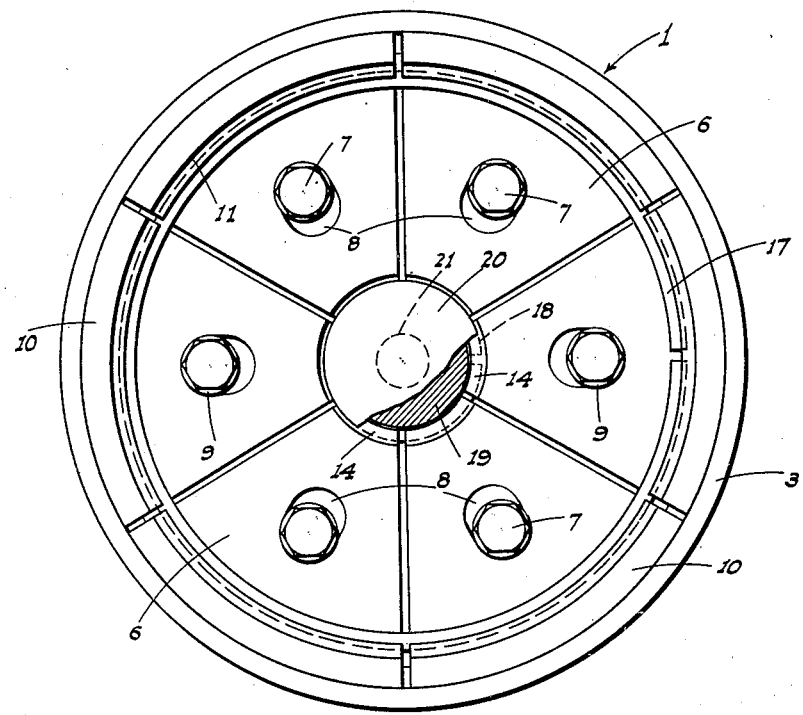
Fig. 1 is a front end view of the chuck.
Figure 2:
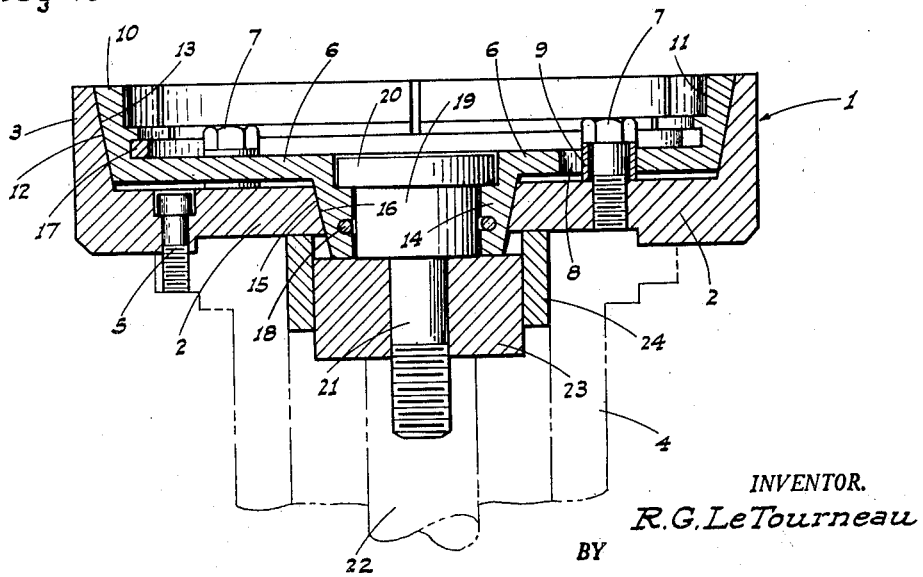
Fig. 2 is a sectional plan on line 2—2 of Fig. 1.

Referring now more particularly to the characters of reference on the drawings, the improved chuck comprises an annular body, indicated generally at 1, including a circular back plate 2 and a forwardly projecting annular flange 3 at the periphery thereof. The back plate 2 is formed for matching engagement with the free end of a lathe spindle 4, and said plate is attached to the latter in concentric relation by a row of cap screws 5, whereby the annular body 1 is fixed in connection with said spindle.

A plurality of segmental radial jaws, indicated generally at 6, are disposed mainly within the concavity of the annular body 1 in adjacent but spaced side by side relation about a common axis, i. e. the axis of said body 1.

The jaws 6 are retained within the body 1, for limited but guided radial motion, by cap screws 7 which extend through elongated radial slots 8 formed centrally through the jaws 6; said cap screws 7 being threaded into the back plate 2, and carrying spacer sleeves 9 which prevent binding of the jaws in their path of movement. These screws perform two other important functions. Firstly, by using different length spacer sleeves, the cap screws will serve as a work stop to position the work in the chuck at the proper depth to permit certain machine operations without changing the tool setting when working on production quantities; and secondly, these screws are the only positive connection between the jaws 6 and the body 1, and act as dogs to transmit torque from the spindle mounted back plate 2.

At their outer ends the jaws 6 are formed with forwardly projecting, annular, segmental flanges 10, the inner faces of which are formed as work engaging faces 11, likewise of annular segmental configuration. The faces 11 are straight transversely, i. e. parallel to the axis of the chuck.

The forwardly projecting, annular flange 3 of the body 1 is formed, on its radially innermost face, with an axially inward taper 12, and the peripheries of the annular segmental flanges 10 of the jaws 6 are formed on a matching taper 13.

At their radially innermost ends the jaws 6 include axially inwardly projecting annular hub segments 14 which extend through an axially inwardly tapered central bore 15 in the back plate 2. The peripheral portions of the hub segments 14 are matchingly tapered, as at 16.

The taper 12 of flange 3, and its engaging taper 13, and the bore taper 15, and its engaging taper 16, are all substantially parallel, i. e. cut on the same angle.

An annular expanding ring 17 is seated within the described segmental jaw assembly and urges the jaws 6 radially outward. A similar annular expanding ring 18 is carried within the segmental hub assembly, and similarly acts on the jaws. With this arrangement the segmental jaw assembly tends to open.

It will be noted, from the above description of the mounting of the segmental jaw assembly, that upon axially inward shifting thereof the cooperating tapers 12 and 13, and 15 and 16, will act to positively and simultaneously shift the jaws 6 inwardly equal distances so that the jaws remain concentric to the axis of the chuck and thus effectively and accurately clamp a work piece for machining.

The fact that the tapers 12 and 13, and 15 and 16, are disposed in adjacent radial planes, and close to the face of the spindle 4, minimizes actual leverage which would lead to misalinement of the work piece, especially in connection with heavy-duty machining operations. This proximity to the spindle face is of value to those skilled in the art, because it reduces tool chatter and allows maximum speed of operation, and depth of cut, while increasing the accuracy of the machine.

As the chuck is composed of a plurality of separate jaws, it permits of the use of thicker and sturdier construction thereof, since the jaws themselves do not require the resilience necessary in slotted one-piece type collet chucks.

Movement of the segmental jaw assembly between open and closed positions, i. e. axially of the lathe spindle 4, is accomplished by power mechanism, and through the medium of the following described structural arrangement:

The segmental hub assembly comprised of the hub segments 14 surrounds a relatively slidable, axially disposed neck 19 having an enlarged circular head 20 on its outer end, which head is disposed within recessed portions of the hub segments 14 and bears against the adjacent ends of the latter.

An axial stem 21 projects in rigid relation from the opposite end of the neck 19 and is threaded into the adjacent end of a pull rod 22.

An enlarged thrust and guide collar 23 surrounds the stem 21 between the neck 19 and pull rod 22; said thrust and guide collar 23 being carried, in slidable relation, in a bushing 24 in the spindle 4. The diameter of the thrust and guide collar is greater than the diameter of the taper bore 15, whereby said collar 23 will abut against the back plate 2 to limit the forward or outward movement of the described jaw control assembly.

The pull rod 22 is reversibly power actuated, under the control of the lathe operator, by means such as a fluid pressure actuated power cylinder (not shown).

It will be recognized that upon axially inward or outward movement of the pull rod 22 by the power means, the assembly of neck 19, head 20, and collar 23 will cause the segmental jaw assembly to shift inwardly or outwardly, respectively; the described taper arrangement then causing contraction or expansion of the chuck in the manner previously described.

While in a sense inter-acting, the cooperating tapers 12 and 13 are the ones which impart the direct work gripping force to the faces 11 of the jaws 6, while the cooperating tapers 15 and 16 serve to shift the jaws between open and closed position.

The described mounting and actuating arrangement for the chuck jaws assures of uniform and alined closing motion thereof, so that the work is positively and evenly engaged about its periphery; the work engaging faces 11 remaining parallel to the chuck axis at all times.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention as defined by the appended claims.

Having thus described the invention, the following is claimed as new and useful, and upon which Letters Patent are desired:

1. A collet chuck comprising a body which includes a circular back plate, means for fixing the back plate to a lathe spindle, a forwardly projecting annular flange about the periphery of the back plate, the inner face of the flange being tapered, the back plate being provided with a center bore, the face of the bore being tapered in parallelism with the tapered face of the flange, a plurality of segmental jaws, each jaw comprising a substantially flat portion disposed adjacent but spaced from the back plate and lying in substantial parallelism with such back plate, an outwardly projecting flange on the outer edge of said flat portion, the outer face of such latter flange being tapered and lying adjacent and co-operating with the tapered inner face of the annular flange on the back plate, an inwardly projecting flange on the inner end of the flat portion, such inner flange projecting through the bore in the back plate and having a tapered outer face co-operating with the tapered face of the bore, fastening means connecting the flat portions of the jaws with the back plate for radial sliding movement with respect to the central axis of the back plate, and means for moving the jaws co-axially with respect to the back plate.

2. A collet chuck comprising a body which includes a circular back plate, means for fixing the back plate to a lathe spindle, a forwardly projecting annular flange about the periphery of the back plate, the inner face of the flange being tapered, the back plate being provided with a center bore, the face of the bore being tapered in parallelism with the tapered face of the flange, a plurality of segmental jaws, each jaw comprising a substantially flat portion disposed adjacent but spaced from the back plate and lying in substantial parallelism with such back plate, an outwardly projecting flange on the outer edge of said flat portion, the outer face of such latter flange being tapered and lying adjacent and co-operating with the tapered inner face of the annular flange on the back plate, an inwardly projecting flange on the inner end of the flat portion, such inner flange projecting through the bore in the back plate and having a tapered outer face co-operating with the tapered face of the bore, the flat portions of the jaws being provided with slots which are elongated radially with respect to the central axis of the back plate, bolts projecting through said slots and secured in the back plate, and means for moving the jaws co-axially with respect to the back plate.

3. A structure as in claim 2 in which the bolts are headed, and spacer sleeves interposed between the back plate and the heads on the bolts.

ROBERT G. LE TOURNEAU.

REFERENCES CITED

The following references are of record in the file of this patent:

UNITED STATES PATENTS

| Number | Name | Date |
|---|---|---|
| 1,058,237 | Heald | Apr. 8, 1913 |
| 1,403,415 | Iggberg | Jan. 10, 1922 |
| 1,407,213 | Olson | Feb. 21, 1922 |
| 1,665,250 | Atkins | Apr. 10, 1928 |
| 1,859,042 | Kolar | May 17, 1932 |